(12) United States Patent
Hirai

(10) Patent No.: US 11,188,272 B2
(45) Date of Patent: Nov. 30, 2021

(54) DEVICE MANAGEMENT SYSTEM AND METHOD FOR TRANSMISSION OF SERVICE INFORMATION EXCLUDING RESTRICTED INFORMATION

(71) Applicant: CANON KABUSHIKI KAISHA, Tokyo (JP)

(72) Inventor: Masahito Hirai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/011,482

(22) Filed: Sep. 3, 2020

(65) Prior Publication Data

US 2021/0089243 A1    Mar. 25, 2021

(30) Foreign Application Priority Data

Sep. 20, 2019  (JP) .............................. JP2019-172062

(51) Int. Cl.
*G06F 21/60*   (2013.01)
*G06F 3/12*    (2006.01)

(52) U.S. Cl.
CPC .......... *G06F 3/1203* (2013.01); *G06F 3/1232* (2013.01); *G06F 3/1287* (2013.01)

(58) Field of Classification Search
CPC ...... G06F 3/1203; G06F 3/1232; G06F 21/60; G06F 21/6254

USPC ......... 358/1.15, 1.9, 1.16; 709/246; 382/190
See application file for complete search history.

(56) References Cited

U.S. PATENT DOCUMENTS

2002/0188187 A1\* 12/2002 Jordan ...................... H04N 1/38
                                                600/407
2012/0317277 A1\* 12/2012 Hirahara ............. G06F 11/3065
                                                709/224

FOREIGN PATENT DOCUMENTS

JP          2012255946 A    12/2012

\* cited by examiner

*Primary Examiner* — Jamares Q Washington
(74) *Attorney, Agent, or Firm* — Rossi, Kimms & McDowell LLP

(57) ABSTRACT

A first agent of a system comprises: an acquisition unit configured to acquire device information from a network device; a first transmission unit configured to transmit the acquired device information to a second agent; a first receiving unit configured to receive service information that has excluded some information of the device information from the second agent; a second transmission unit configured to transmit the service information to a device management system. The device management system of the system comprises a second receiving unit configured to receive service information after monitoring has been performed by a comparison between service information transmitted from the second transmission unit to the device management system and service information transmitted from the second agent to the first agent.

8 Claims, 14 Drawing Sheets

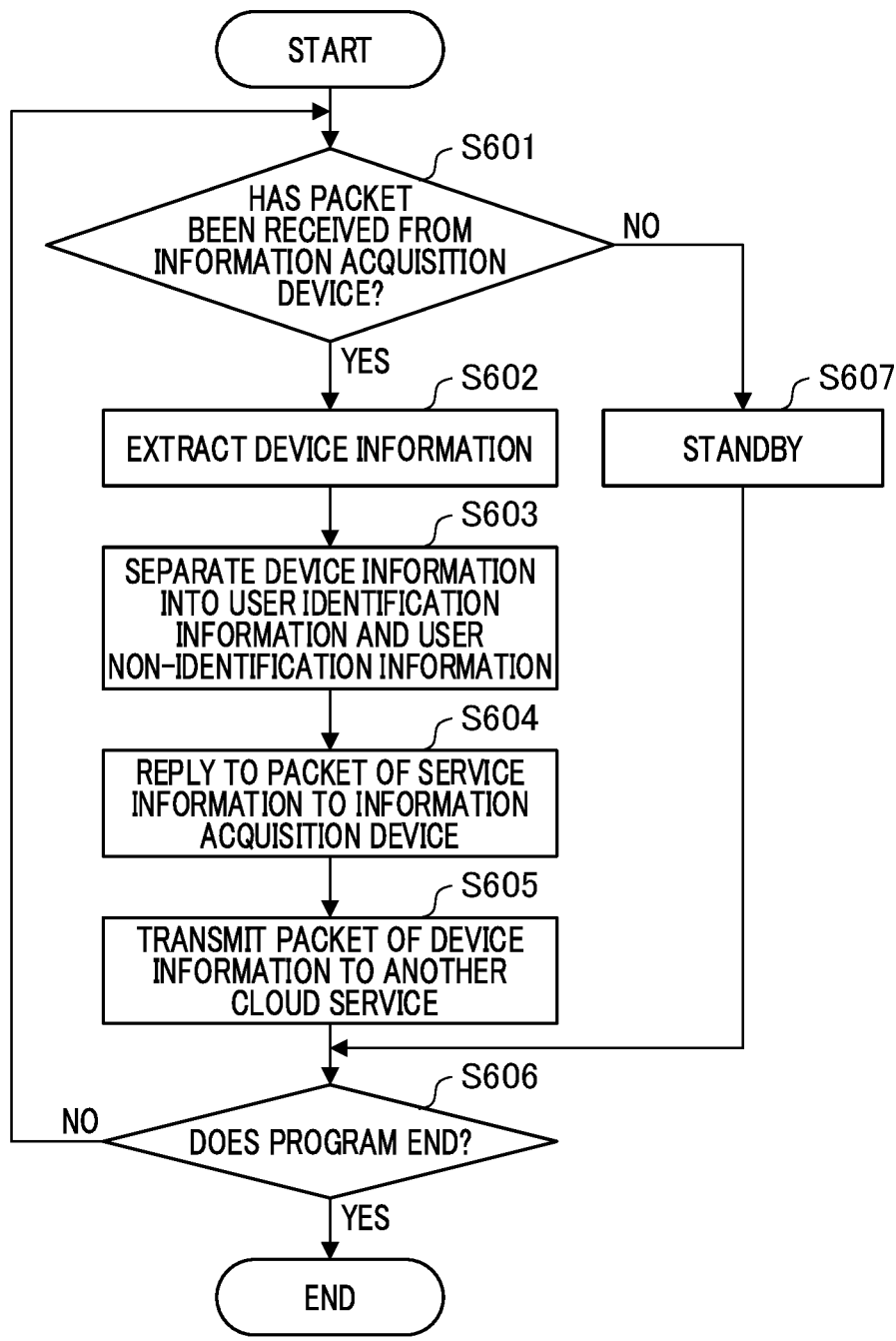

DEVICE MANAGEMENT SYSTEM AND METHOD FOR TRANSMISSION OF SERVICE INFORMATION EXCLUDING RESTRICTED INFORMATION

BACKGROUND OF THE INVENTION

Field of the Invention

The present invention relates to a system and a method.

Description of the Related Art

For example, a device management system for managing a plurality of devices such as a multifunction peripheral that acquires information from a device to be managed and transmits the acquired information to a cloud service is known.

A mechanism is also proposed in which information transmitted from a monitoring apparatus to a central management apparatus is stored in a local network and a system administrator of the local network and the like can check the output data (refer to Japanese Patent Application Laid-Open Publication No. 2012-255946).

For example, a case is assumed in which a user who manages a device acquires device information by using a device management environment that is operated by another person. Additionally, the information acquired from the device may also include information that can identify the user, for example, information regarding device location.

In such a case in which the information acquired from the device may also include the information that can identify the user, if the information is transmitted to a cloud service in the device management environment of another person without restriction, inconveniences may occur for the user. Therefore, for the user who uses the device management system, there is a need for a mechanism that prevents unintended information from being transmitted to the cloud service.

SUMMARY OF THE INVENTION

A system of one embodiment of the present invention includes a first agent and a device management system. The first agent comprises: a memory storing instructions; and a processor executing first instructions causing the first agent to: acquire device information from a network device; transmit the acquired device information to a second agent; receive service information that has excluded some information of the device information from the second agent; and transmit the service information to the device management system. The device management system comprises: a memory storing instructions; and a processor executing second instructions causing the device management system to: receive service information after monitoring has been performed by a comparison between service information transmitted from the first agent to the device management system and service information transmitted from the second agent to the first agent.

Further features of the present invention will become apparent from the following description of exemplary embodiments with reference to the attached drawings.

BRIEF DESCRIPTION OF THE DRAWINGS

FIG. 14 is a flowchart of an operation example of the information separation device.

DESCRIPTION OF THE EMBODIMENTS

Embodiments for performing the present invention will be described below with reference to the drawings and the like.

First Embodiment

Figure 1:
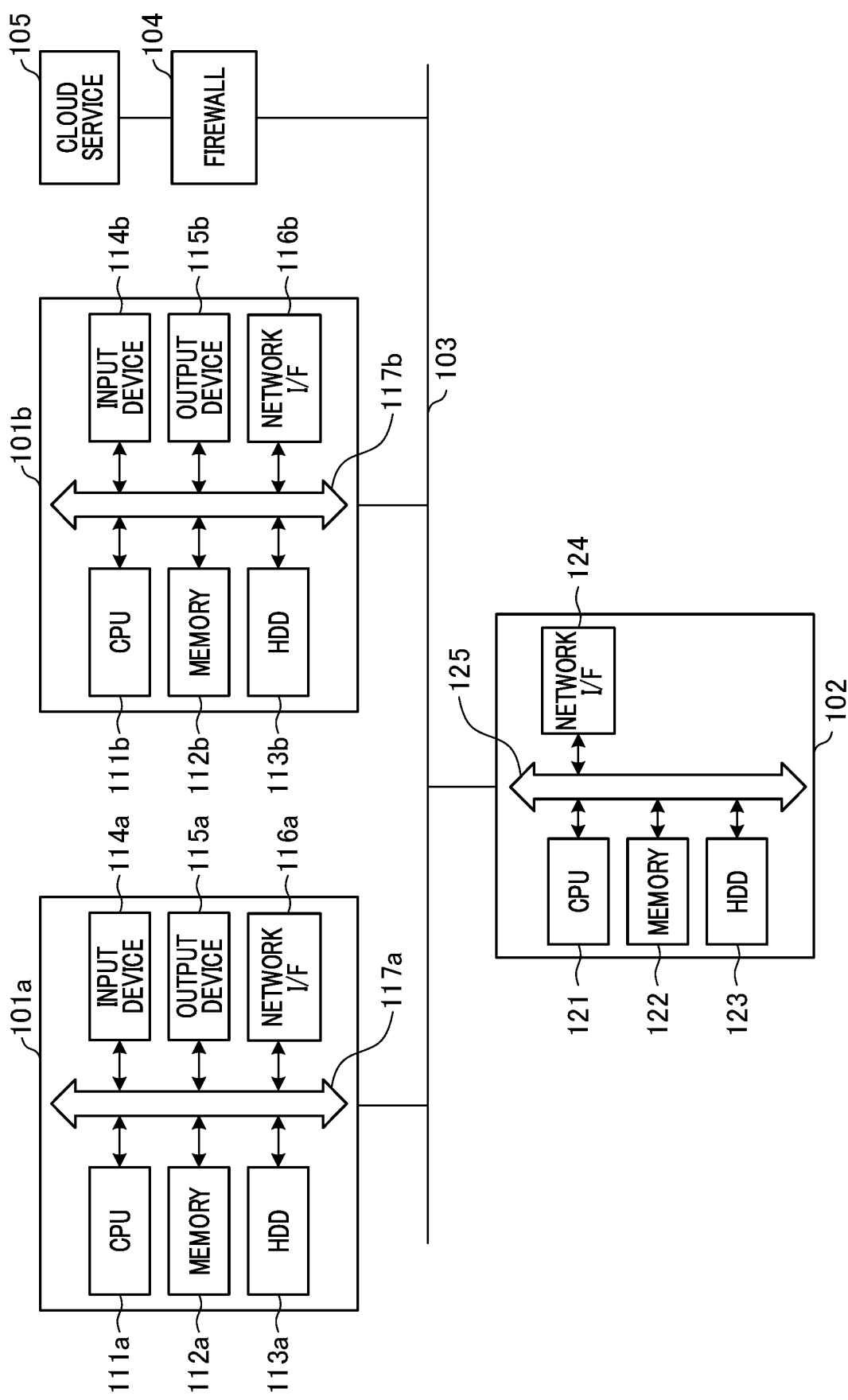
FIG. 1 illustrates an example of the overall configuration of an information processing system according to the first embodiment.

FIG. 1 illustrates an example of the overall configuration of an information processing system in the first embodiment including a device management system. The information processing system shown in FIG. 1 has an information acquisition device 101a, an information separation device 101b, a device 102, and a firewall 104, and these components are connected by a network 103. The network 103 of the information processing system is connected to a cloud service 105 through the firewall 104. The number of devices 102 in the information processing system is not limited to the example shown in FIG. 1, and two or more devices 102 may be used.

Here, the information acquisition device 101a is an example of a first agent, and is operated by a system operator who operates the device management system. The information separation device 101b is an example of a second agent, and is operated by a user who uses the device management system.

The device 102 is an example of the network device and is an information processing device managed by the user. The device 102 is not limited to the one used by the user himself or herself, and may be used by a customer who is provided with a service from the user. Examples of the device 102 include various peripheral devices that can be connected to the network, for example, image forming apparatuses such as a printer and a multifunction peripheral, a network-connected projector, and a network camera.

The information acquisition device 101a has a CPU 111a, a memory 112a, an HDD 13a, an input device 114a, an output device 115a, a network I/F 116a, and an internal bus 117a. Note that the CPU is abbreviation for "Central Processing Unit" and the HDD is abbreviation for "Hard Disk Drive".

The CPU 111a generally controls each unit of the information acquisition device 101a via the internal bus 117a. The CPU 111a, the memory 112a, the HDD 113a, the input device 114a, the output device 115a, and the network I/F 116a are connected to the internal bus 17a.

The memory 112a is, for example, a memory that functions as a work area of the CPU 111a. The HDD 113a stores a program that realizes the process of the flowchart of FIG. 6, which will be described below, and various data.

The input device 114a is an input device that receives an input from external devices and acquires input information. The output device 115a is a display device that displays a program screen and the like. The input device 114a and the output device 115a may be external to the information acquisition device 101a. Additionally, the network I/F 116a communicates with a device connected to the network 103 via the network 103 to transmit and receive data in one direction or both directions.

The CPU 111a loads a program from the HDD 113a to the memory 112a and executes the program. Accordingly, the CPU 111a transmits and receives signals to and from the information separation device 101b, the device 102, and the firewall 104 via the network I/F 116a and the network 103. The CPU 111a also writes and reads data to and from the hard disk 13a.

The information separation device 101b has a CPU 111b, a memory 112b, an HDD 113b, an input device 114b, an output device 115b, a network I/F 116b, and an internal bus 117b. Since each component of the information separation device 101b is similar to that of the information acquisition device 101a, the redundant description thereof will be omitted. The HDD 113b stores a program that realizes the process of the flowchart of FIG. 14, which will be described below, and various data.

The device 102 has a CPU 121, a memory 122, an HDD 123, a network I/F 124, and an internal bus 125. Since the components of the device 102 are similar to those having the same name of the information acquisition device 101a and the information separation device 101b, the redundant description thereof will be omitted. The CPU 121 of the device 102 transmits and receives signals to and from the information acquisition device 101a via the network I/F 124 and the network 103.

The firewall 104 is an information processing device that transmits and receives signals to and from the information acquisition device 101a, the information separation device 101b, and the cloud service 105. The firewall 104 has a storage unit that stores a program that realizes the process of the flowchart of FIG. 7, to be described below, and has a calculation unit that executes the program.

The cloud service 105 is an information processing device that receives service information, to be described below, regarding the device 102 transmitted from the information acquisition device 101a, stores the service information in an internal storage, and manages the service information on the network 103. The cloud service 105 configures, for example, a part of the device management system. The cloud service 105 may be configured by a plurality of information processing devices.

Figure 2:
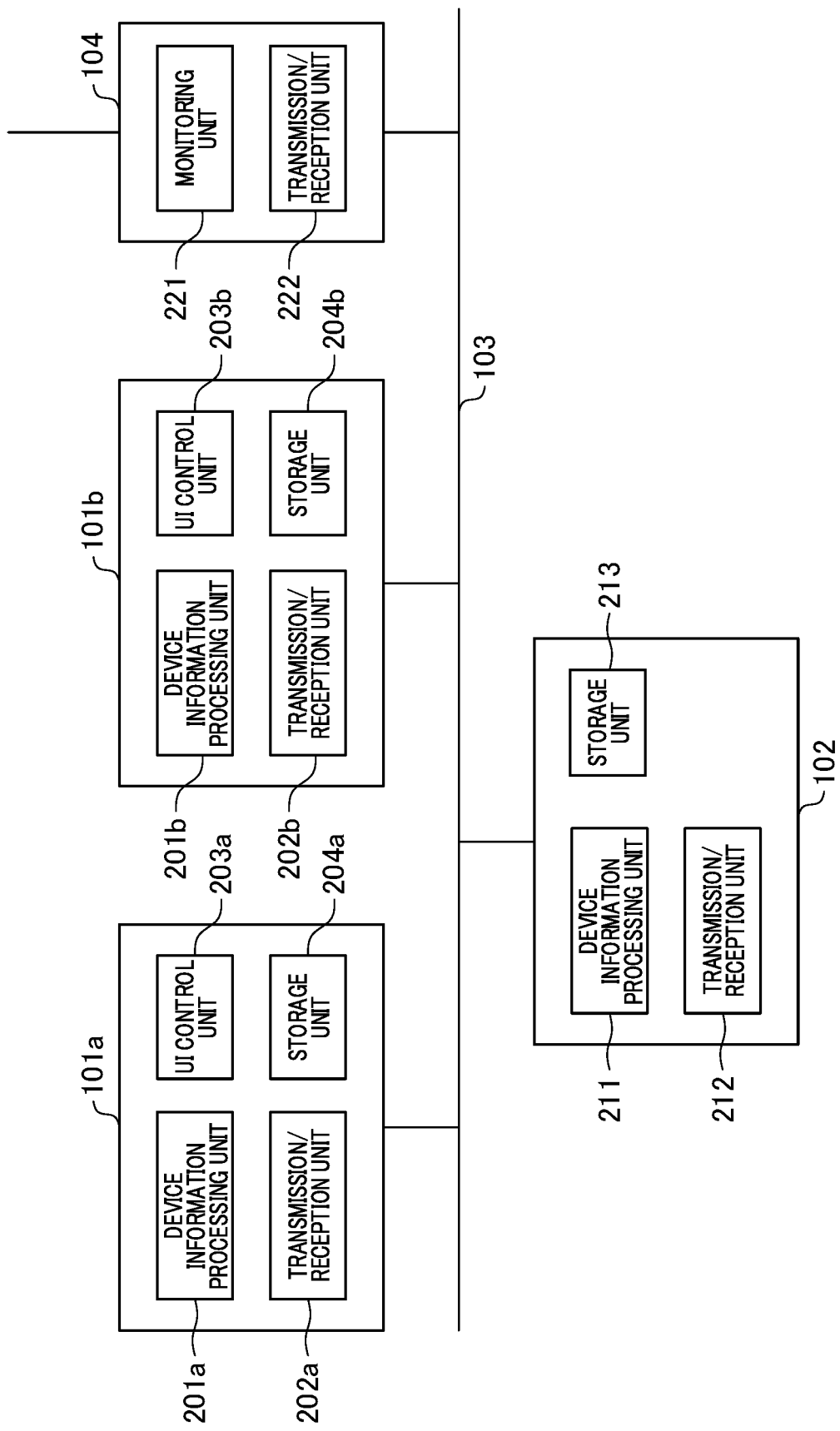
FIG. 2 illustrates a configuration example of the software of the information processing system of FIG. 1.

FIG. 2 illustrates an example of the software configuration of the information processing system of FIG. 1. Note that the cloud service 105 is not shown in FIG. 2. The information acquisition device 101a includes a device information processing unit 201a, a transmission/reception unit 202a, a UI control unit 203a, and a storage unit 204a.

The device information processing unit 201a generates a request for acquiring the device information to the device 102, analyzes the information received from the device 102, and transmits the information to the cloud service 105 or the information separation device 101b. The transmission/reception unit 202a transmits and receives data to and from the information acquisition device 101a.

The UI control unit 203a receives the input of the information from the input device 114a and performs control to generate a screen to be displayed on the output device 115a. The storage unit 204a stores various types of information to be used in the device information processing unit 201a.

Hereinafter, the outline of the process performed by the software of the information acquisition device 101a will be described below. The storage unit 204a of the information acquisition device 101a stores Data Table A showing a device list, which is schematically shown in Table 1. The Data Table A includes items "Device ID", "Device Name", "IP address", and "location", and in Table 1, only the information regarding the item "IP address" is recorded. Additionally, the device list of the Data Table A can be displayed on the output device 115a by the UI control unit 203a, and the Data Table A can be edited by, for example, an operator of the information acquisition device 101a.

TABLE 1

Data Table A

| Device ID | Device Name | IP address | location |
|---|---|---|---|
| | | 192.168.2.2 | |
| | | 192.168.2.4 | |

The device information processing unit 201a refers to the Data Table A of the storage unit 204a and acquires the IP address of the device 102 to be serviced. Subsequently, the device information processing unit 201a generates a request to the device 102 having the acquired IP address for acquiring the device information by protocols such as SNMP (Simple Network Management Protocol).

Upon receiving the request for acquiring the device information from the device information processing unit 201a, the transmission/reception unit 202a transmits a request packet to the device 102 via the network I/F 116a. The request packet is regularly transmitted at a time predetermined in the program. The transmission/reception unit 202a also receives a response packet from the device 102 via the network I/F 116a. There are cases in which the transmission/reception unit 202a irregularly receives the response packet from the device 102.

Figure 3:
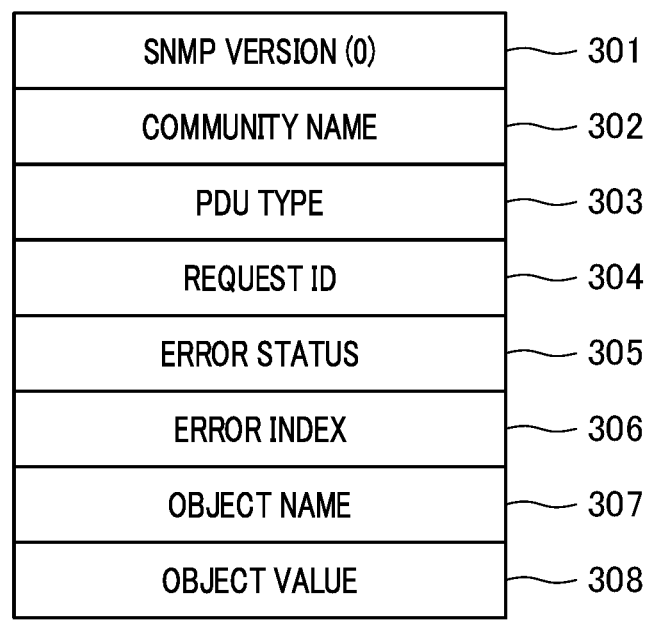
FIG. 3 illustrates a configuration example of a packet transmitted and received in conformity with SNMP.

FIG. 3 illustrates a configuration example of the packet transmitted and received in conformity to SNMP. FIG. 3 illustrates a configuration example of the packet in SNMP version 1. The packet includes information regarding version information 301, community name 302, PDU type 303, request ID 304, error status 305, error index 306, object name 307, and object value 308.

The SNMP version 301 is the version information of SNMP and, in the case of version 1, the numeric value 1 is described. When a management device 101 acquires one item of information from the device 102, a value "Get Request (0xA0)" indicating acquiring one item of information is described in the PDU type 303 and the name of the value acquired is described in the object name 307. If the response packet of the device 102 indicates an error, a value indicating the error is described in the error status 305. If the response packet is not an error, an object value 308 corresponding to the object name 307 is described.

The device information processing unit 201a analyzes the response packet received from the device 102 and stores the device information based on the analysis result in the storage unit 204a. For example, the device information processing unit 201a stores information (each item of Device ID, DeviceName, and location), which is absent from the Data Table A shown in Table 1, in association with "IP address". An example of the Data Table A that has been updated based on the information of the response packet is shown in Table 2.

TABLE 2

Date Table A

| Device ID | Device Name | IP address | Location |
|---|---|---|---|
| 12345678 | iR3322 | 192.168.2.2 | osaka, office1 |
| 32345678 | iR2222 | 192.168.2.4 | tokyo, office2 |

The device information processing unit 201a acquires the transmission destination information stored in the storage unit 204a at a predetermined time, and generates a packet including the transmission destination information by using a technique, for example, REST API. Subsequently, the transmission/reception unit 202a transmits the generated packet to the cloud service 105 or the information separation device 101b via the network I/F 116a. The storage unit 204a stores the transmission destination information (URL) of the cloud service to serve as an initial value of the transmission destination information.

Figure 4:
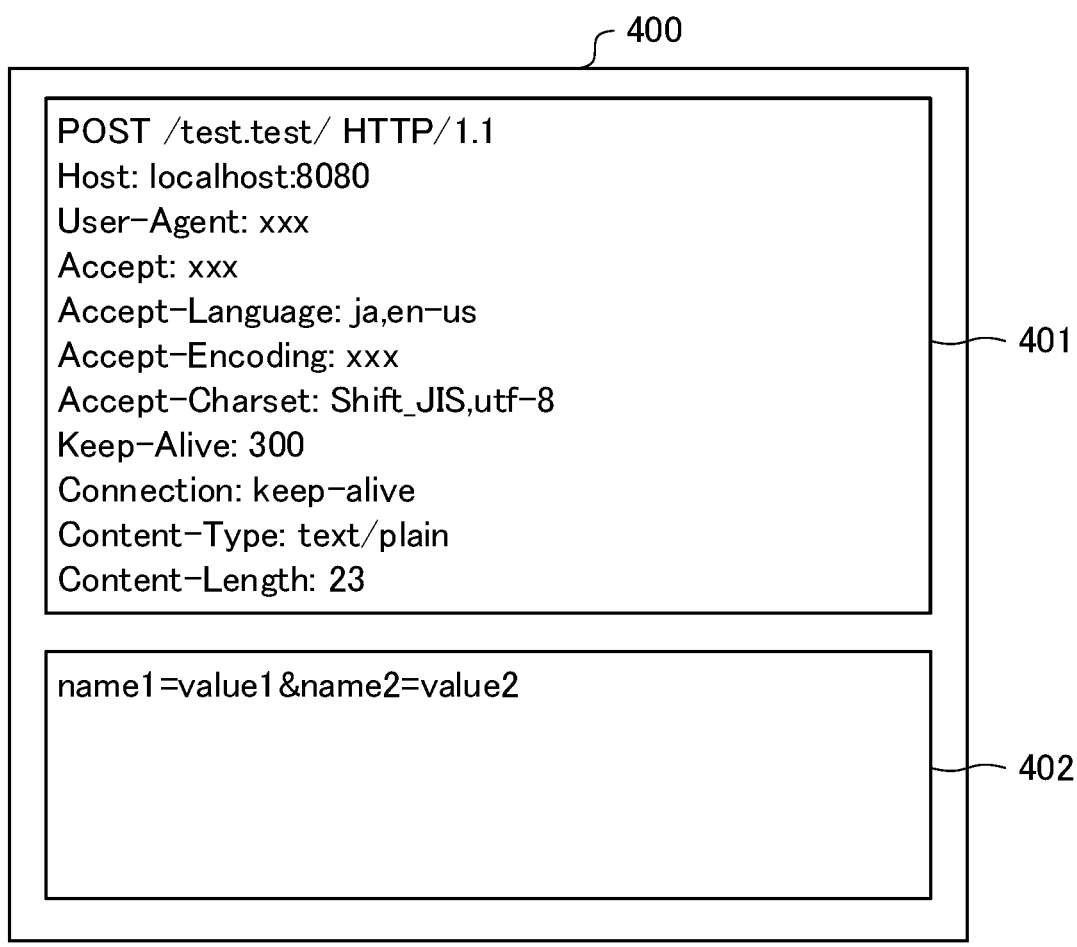
FIG. 4 illustrates a configuration example of data of REST API.

FIG. 4 illustrates a configuration example of data of REST API. A data 400 of REST API includes a header portion 401 and a body portion 402. In the body portion 402, for example, "location" is defined as a variable name, and a value of, for example, "osaka, office 1" is stored for the variable.

Figure 5:
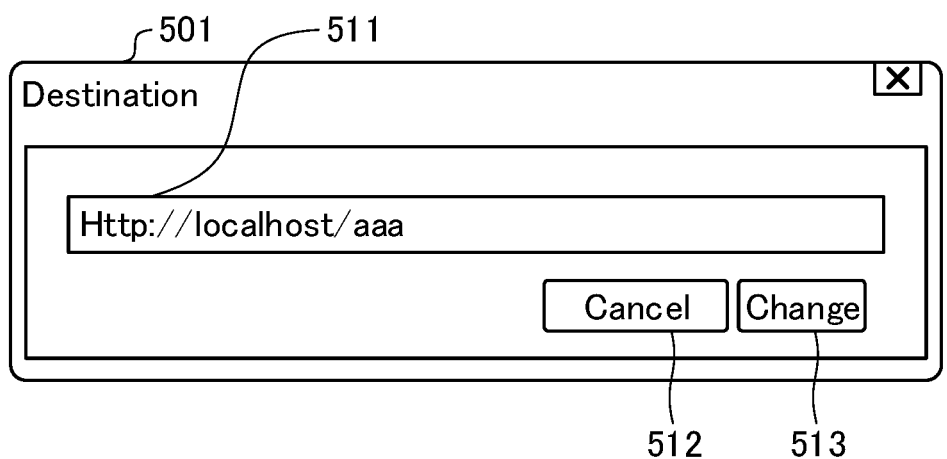
FIG. 5 illustrates an example of a screen for changing a transmission destination of information in an information acquisition device.

FIG. 5 illustrates an example of a setting screen 501 of the transmission destination of the information displayed in the information acquisition device 101a. The setting screen 501 of FIG. 5 is displayed on the output device 115a of the information acquisition device 101a under the control of the UI control unit 203a.

The setting screen 501 includes a transmission destination input unit 511 that receives an input of the address of the transmission destination, a cancel button 512 that receives a cancel operation for the transmission destination change, and a change button 513 that receives the operation for the transmission destination change. Upon receiving the pressing of the change button 513 on the setting screen 501, the UI control unit 203a reads the address information that has been input to the transmission destination input unit 511 and stores the read address information in the storage unit 204a as the transmission destination information.

The description will return to FIG. 2. When the transmission/reception unit 202a receives device information (also referred to as "service information") that does not include the user identification information from the information separation device 101b by REST API, it transfers the packet of the service information to the cloud service 105. The generation of the service information performed by the information separation device 101b will be described below.

Subsequently, a software configuration of the information separation device 101b will be described. The information separation device 101b includes the device information processing unit 201b, the transmission/reception unit 202b, the UI control unit 203b, and the storage unit 204b. The basic functions of the UI control unit 203b and the storage unit 204b of the information separation device 101b are the same as the functions of the components having the same name of the information acquisition device 101a.

Hereinafter, the outline of the process by the software of the information separation device 101b will be described below. A transmission/reception unit 202b of the information separation device 101b receives the packet (FIG. 4) from the information acquisition device 101a. A device information processing unit 201b extracts the device information from the packet received from the information acquisition device 101a, and separates the information into the user identification information and the user non-identification information. Thus, the device information processing unit 201b can generate service information in which some of information (user identification information) has been excluded from the device information. The user identification information and the user non-identification information are defined based on the determination information stored in the storage unit 204b (Data Table B to be described below).

The transmission/reception unit 202b transmits the packet based on the service information to the device information processing unit 201a and the firewall 104 via the network I/F 116b. The packet is basically similar to the data configuration of REST API shown in FIG. 4. Specifically, the information separation device 101b separates the user identification information from the device information, and returns the packet of the service information from which the user identification information has been excluded to the information acquiring device 101a. For example, the information separation device 101b can separate the information regarding the position (location) at which the device exists from the device information to serve as the user identification information.

In contrast, the transmission/reception unit 202b may transmit the packet of the device information including the user identification information to another cloud service (not illustrated) that is different from the cloud service 105. Another cloud service is, for example, a cloud service managed by a user.

Next, the software configuration of the device 102 will be described. The device 102 includes a device information processing unit 211, a transmission/reception unit 212, and a storage unit 213. The transmission/reception unit 212 receives a request packet from the information acquisition device 101a via the network I/F 124, and transmits a response packet to the information acquisition device 101a. The device information processing unit 211 generates a response packet that includes the device information in response to the reception of the request packet or the occurrence of a predetermined event or the like, and provides instructions for the transmission of the response packet to the transmission/reception unit 212. The storage unit 213 stores, for example, information required for generating the device information and information regarding generating condition of the response packet.

Next, the software configuration of the firewall 104 will be described. The firewall 104 includes a monitoring unit 221 and a transmission/reception unit 222.

The transmission/reception unit 222 receives the packet from the information acquisition device 101a and the information separation device 101b, and transmits the packet monitored by the monitoring unit 221 to the cloud service 105. The transmission/reception unit 222 also provides a notification about the monitoring result for the packet performed by the monitoring unit 221 to the information separation device 101b.

The monitoring unit 221 compares the packets from the information acquisition device 101a and the information separation device 101b, and monitors the packets transmitted from the information acquisition device 101a to the cloud service 105. The monitoring unit 221 also performs a process of stopping transmission of the packet to the cloud service 105 based on the monitoring result and provides an instruction for notification to the information separation device 101b. Note that the monitoring unit 221 may decode the encrypted information by using a secret key obtained in advance as necessary in the information analysis during monitoring of the packet.

Figure 6:
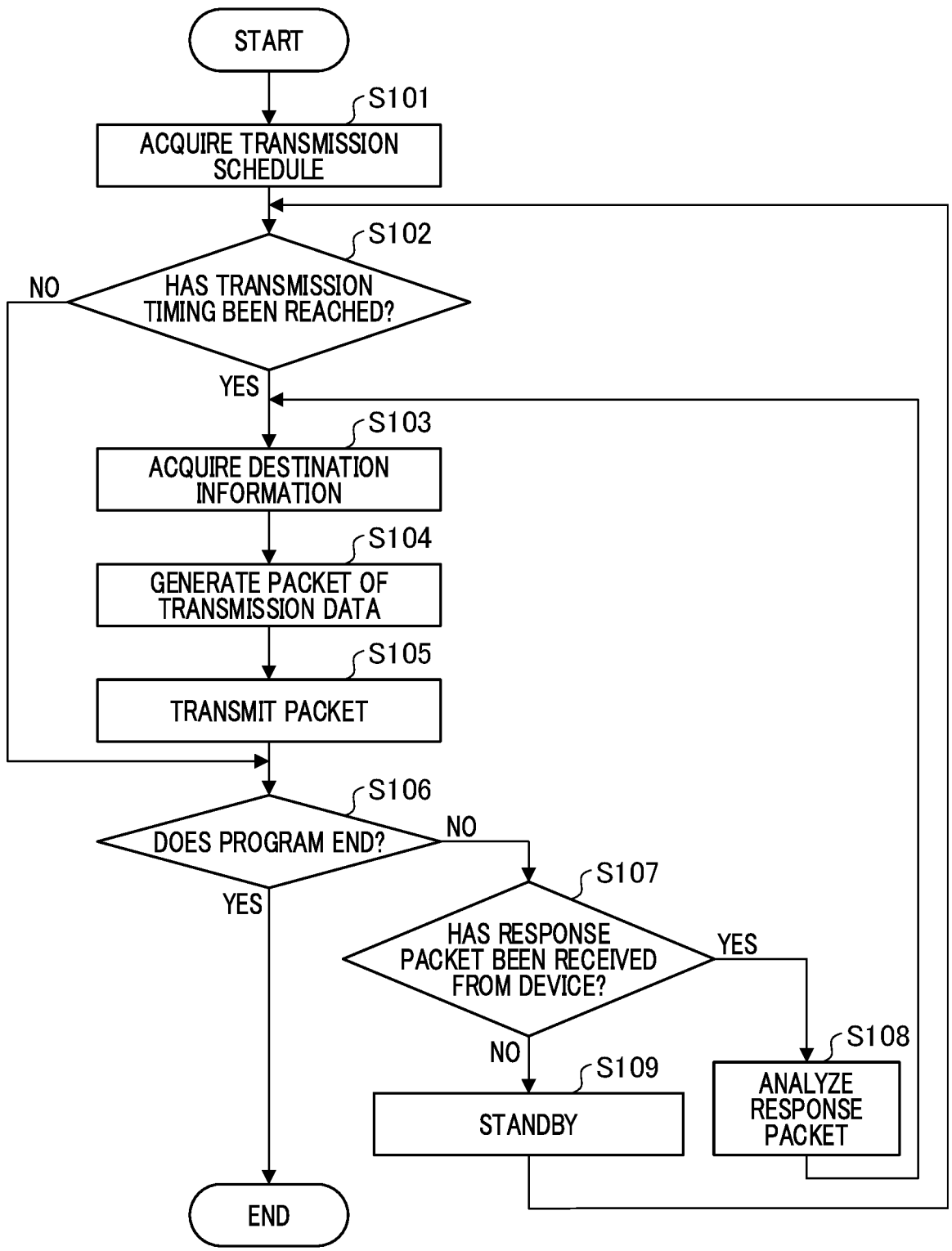
FIG. 6 is a flowchart of an example of transmission/reception processing of the information acquisition device according to the first embodiment.

FIG. 6 is a flowchart of an example of transmission/reception processing of the information acquisition device 101a in the first embodiment. FIG. 6 illustrates a process in which the information acquisition device 101a transmits the device information to the cloud service 105 or the information separation device 101b, and a process in which the information acquisition device 101a receives the device information from the device 102.

In step S101, the device information processing unit 201a of the information acquisition device 101a acquires the transmission schedule of the device information from the storage unit 204a. In step S102, the device information processing unit 201a determines whether or not the transmission timing of the device information specified in the transmission schedule has been reached. When the transmission timing has been reached, the process proceeds to step S103, and when the transmission timing has not been reached, the process proceeds to step S106.

In step S103, the device information processing unit 201a acquires the transmission destination information of the device information from the storage unit 204a. In step S104, the device information processing unit 201a acquires the device information of the Data Table A stored in the storage unit 204a. Subsequently, the device information processing unit 201a generates a packet of the transmission data including the transmission destination information and the device information.

In step S105, the transmission/reception unit 202a transmits the packet to the transmission destination. In step S106, the device information processing unit 201a determines whether or not there is a termination instruction for the program of the transmission/reception processing. If it is determined that there is a termination instruction, the process of FIG. 6 ends. In contrast, if it is not determined that there is a termination instruction, the process proceeds to step S107.

In step S107, the transmission/reception unit 202a determines whether or not the response packet has been received from the device 102. If it is determined that the response packet has been received, the process proceeds to step S108, and if it is not determined that the response packet has been received, the process proceeds to step S109.

In step S108, the device information processing unit 201a analyzes the response packet received from the device 102 in conformity to SNMP. Subsequently, the device information processing unit 201a stores the device information obtained from the response packet in the Data Table A of the storage unit 204a. Accordingly, the Data Table A is updated to the state of the table 2. Subsequently, the process proceeds to step S103.

In step S109, the device information processing unit 201a waits for the process for a predetermined time. Subsequently, the process proceeds to step S102. Thus, the description of FIG. 6 ends.

FIG. 14 is a flowchart of an operation example of the information separation device 101b in the first embodiment.

In step S601, the transmission/reception unit 202b of the information separation device 101b determines whether or not a packet has been received from the information acquisition device 101a. When the packet has been received, the process proceeds to step S602. In contrast, if the packet has not been received, the process proceeds to step S607, and the device information processing unit 201b waits for the process for a predetermined time. Subsequently, the process proceeds to step S606.

In step S602, the device information processing unit 201b extracts the device information from the received packet. In step S603, the device information processing unit 201b refers to the determination information (Data Table B) stored in the storage unit 204b and separates the device information into the user identification information and the user non-identification information.

An example of the Data Table B serving as the determination information is shown in Table 3. In the Data Table B, information indicating whether or not each of the items "Device ID", "Device Name", "IP address", and "location" corresponds to the user identification information (User Identify) is associated. When the item corresponds to the user identification information, the value of "User Identify" is "1", and when the item does not correspond to the user identification information, the value of "User Identify" is "0". Table 3 shows an example in which the information regarding "location" of the device information is set as the user identification information. Note that the Data Table B can be edited by a user (for example, an operator of the information separation device 101b).

TABLE 3

| Data Table B | |
|---|---|
| Var | User Identify |
| Device ID | 0 |
| Device Name | 0 |
| IP address | 0 |
| location | 1 |

In step S604, the transmission/reception unit 202b generates a packet of service information not including the user identification information. Subsequently, the transmission/reception unit 202b transmits the packet of service information to the information acquisition device 101a via the network I/F 116b. When receiving the packet from the information separation device 101b, the information acquisition device 101a transfers the packet to the cloud service 105.

Additionally, the transmission/reception unit 202b of the information separation device 101b transmits the packet of the service information to the firewall 104 via the network I/F 116b. In step S201 of FIG. 7, which will be described below, the packet is received by the transmission/reception unit 222 of the firewall 104. The packet may be transmitted to the firewall 104 at the same time that the packet is transmitted to the information acquisition device 101*a*, or a plurality of packets may be transmitted in a batch process, or may be transmitted in response to a request from the firewall 104.

In step S605, the transmission/reception unit 202*b* generates a packet of the device information including the user identification information. Subsequently, the transmission/reception unit 202*b* transmits the packet to another cloud service (not illustrated) that is different from the cloud service 105 via the network I/F 116*b*. The REST API for the packet is similar to the contents shown in FIG. 4.

In step S606, the CPU 111*b* determines whether or not the program ends. If it is determined that the program ends, the process of FIG. 14 ends. In contrast, if it is not determined that the program ends, the process returns to step S601. Thus, the description of FIG. 14 ends.

Figure 7:
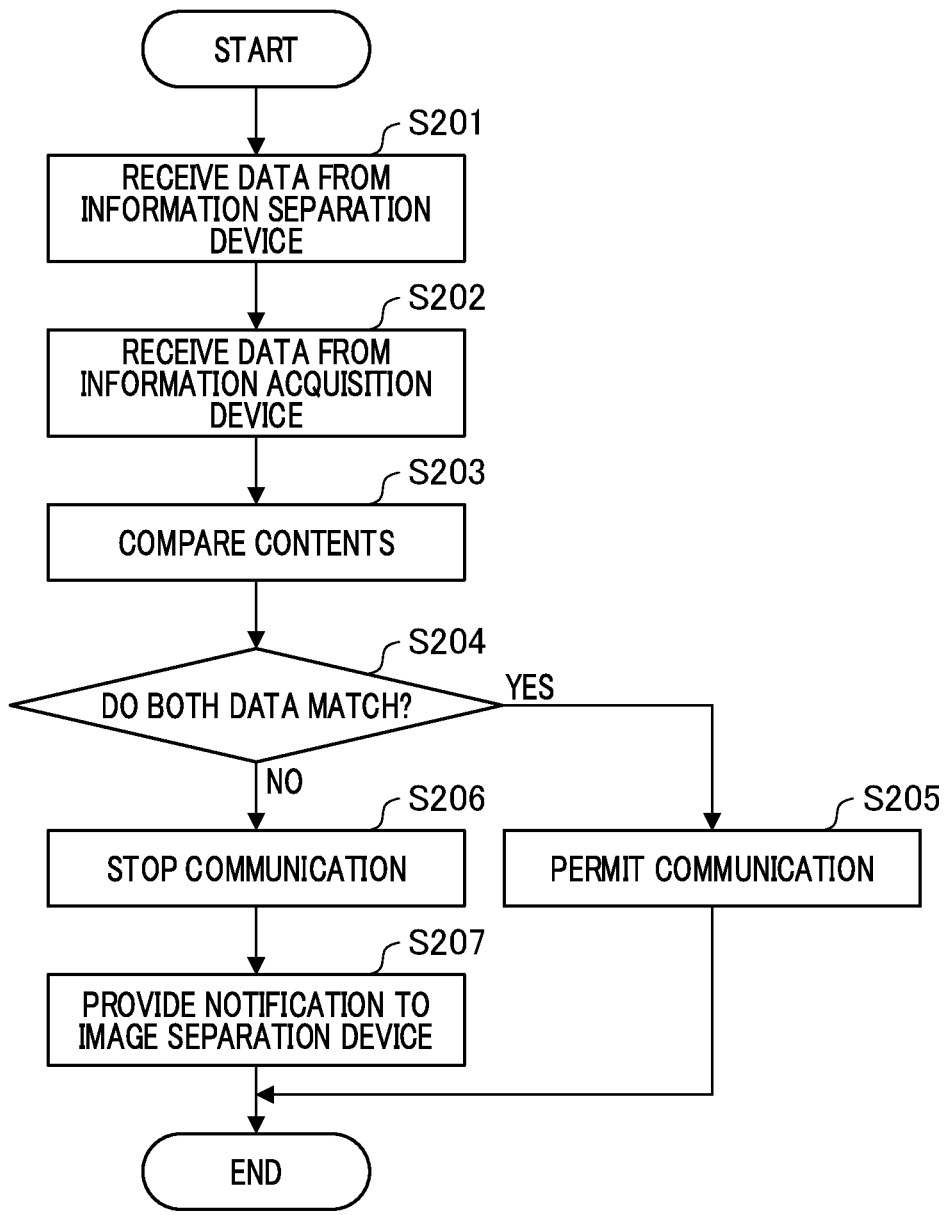
FIG. 7 is a flowchart of an example of firewall monitoring processing in the first embodiment.

FIG. 7 is a flowchart of an example of monitoring processing of the firewall 104 in the first embodiment. In step S201, the transmission/reception unit 222 of the firewall 104 acquires the packet transmitted from the information separation device 101*b*. As a result, the firewall 104 is notified about the service information transmitted from the information separation device 101*b* to the information acquisition device 101*a*.

In step S202, the transmission/reception unit 222 receives the packet related to the device information transmitted from the information acquisition device 101*a*.

In step S203, the monitoring unit 221 compares the contents of the data received in steps S201 and S202. For example, the monitoring unit 221 extracts some of the device information from each of the received data and compares hash values of both extracted data.

In step S204, the monitoring unit 221 determines whether or not both data are identical (whether or not the hash values of the data are the same) as the result for comparison in step S203. If both data are identical, the process proceeds to step S205. In contrast, if both data are not identical, the process proceeds to step S206.

In step S205, the monitoring unit 221 permits the packet transmitted from the information acquisition device 101*a* to be communicated to the cloud service 105. Thus, the transmission/reception unit 222 transmits the packet from the information acquisition device 101*a* to the cloud service 105. Subsequently, the process of FIG. 7 ends. Note that the packet permitted to communicate in step S205 matches the service information transmitted from the information separation device 101*b*, and does not include the user identification information.

In step S206, the monitoring unit 221 performs a process for stopping the communication of the packet transmitted from the information acquisition device 101*a*. Accordingly, the transmission/reception unit 222 discards the packet from the information acquisition device 101*a* without transmitting it to the cloud service 105. Note that the packet for which communication is stopped in step S206 is data that does not match the service information that has been transmitted from the information separation device 101*b* and that may include the user identification information.

In step S207, the monitoring unit 221 provides an instruction for notification regarding the occurrence of a data mismatch to the information separation device 101*b*. Accordingly, the transmission/reception unit 222 transmits the notification packet regarding the notification to the information separation device 101*b* by REST API. Subsequently, the process of FIG. 7 ends.

Figure 8:
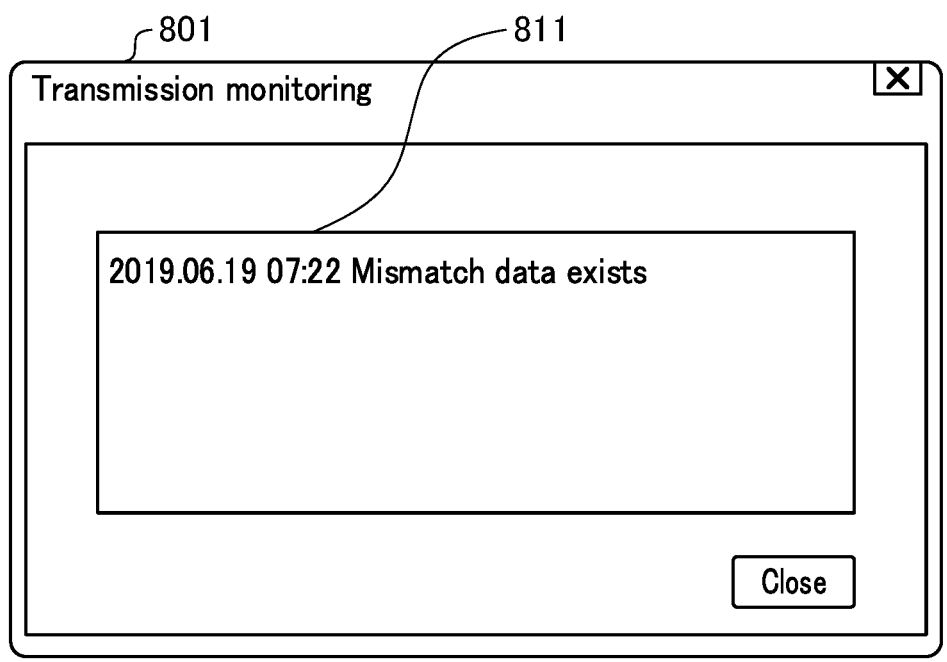
FIG. 8 illustrates an example of an error notification screen.

When the information separation device 101*b* receives the notification packet, it causes the output device 115*b* to output an error notification screen 801 shown in FIG. 8. The error notification screen 801 includes, for example, a log display 811 showing the presence of data that does not match the service information and for which communication with the cloud service 105 has been stopped.

In the first embodiment, the information transmitted from the information acquisition device 101*a* to the device management system is compared with the service information transmitted from the information separation device 101*b* to the information acquisition device 101*a* (S201 to S203). Subsequently, as a result for the monitoring by the comparison, the service information for which communication is permitted is received by the cloud service 105 (S205). Therefore, it is possible to prevent unintended information for a user who uses the device management system, such as the device information that may include the user identification information, from being transmitted from the information acquisition device 101*a* to the cloud service 105.

Additionally, in the first embodiment, when device information that may include the user identification information is detected, notification is provided to the information separation device 101*b*, and the error notification screen 801 is displayed in the information separation device 101*b*. Hence, the user can independently confirm whether or not unintended information has been transmitted from the information acquisition device 101*a* to the cloud service 105 by the information separation device 101*b*.

Second Embodiment

The second embodiment is a configuration example in which, when two or more information separation devices 101*b* exist, information acquired from the device 102 is changed in accordance with the type of the information separation device 101*b*. The second embodiment is also different from the first embodiment in that the device information processing unit 201*a* of the information acquisition device 101*a* does not directly transmit the information received from the information separation device 101*b* to the cloud service 105. Note that, in the description of the embodiment below, the same components as those in the first embodiment are denoted by the same reference numerals, and the redundant description will be omitted.

In the second embodiment, the information acquired from the device 102 by the information acquisition device 101*a* is minimized in accordance with the type of the information separation device 101*b*. Accordingly, a possibility in which unnecessary information is transmitted to another cloud service (not illustrated) corresponding to each information separation device 101*b* can be reduced. In contrast, when the information acquisition device 101*a* limits the device information acquired from the device 102, it is necessary to confirm whether or not the information required when providing a service that uses the information of the cloud service 105 is missing.

For example, an example is assumed in which an information separation device A and an information separation device B exist to serve as the information separation device 101*b* in the information processing system, and different device information is requested between the information separation devices A and B. Assuming the above condition, items of the device information required for each of the information separation devices A and B are shown as the Data Table C of Table 4. Note that the Data Table C is stored in the storage unit 204*a* of the information acquisition device 101*a*.

TABLE 4

Data Table C

| Device ID | Device Name | IP address | location | Print log | Scan log |
|---|---|---|---|---|---|
| Must | Must | Must | A, B | A | B |

In the Data Table C, "A" indicates an item of the device information required for the information separation device A, and "B" indicates an item of the device information required for the information separation device B. Additionally, "MUST" indicates an item of predetermined information required when a service using the information of the cloud service 105 is provided (hereinafter, also referred to as "necessary information"). In the above example, items for three items of necessary information "Device ID", "Device Name", and "IP address" are included as items of the device information required for both of the information separation devices A and B. The items of the device information required for the information separation device A includes "location, Print log" in addition to the three items of the necessary information. Additionally, the items of the device information required for the information separation device B includes "location, Scan log" in addition to the three items of the necessary information.

Figure 9:
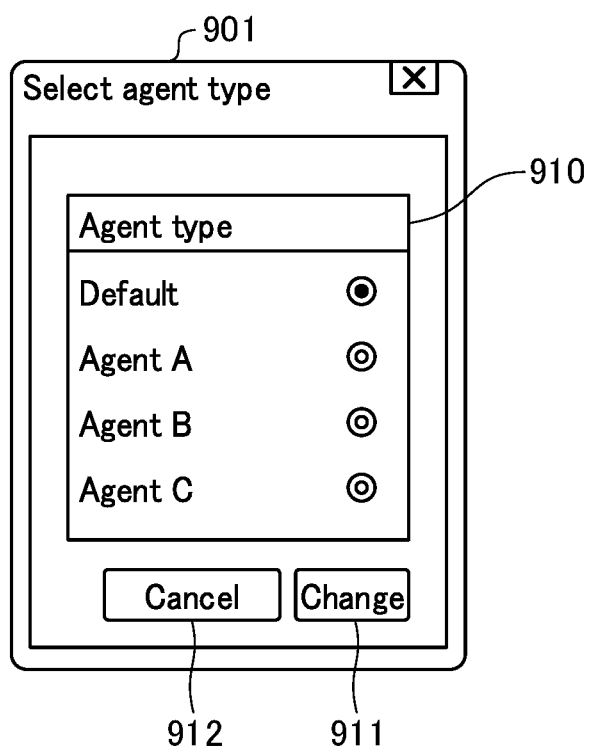
FIG. 9 illustrates an example of a type selection screen of an information separation device according to the second embodiment.
Figure 10:
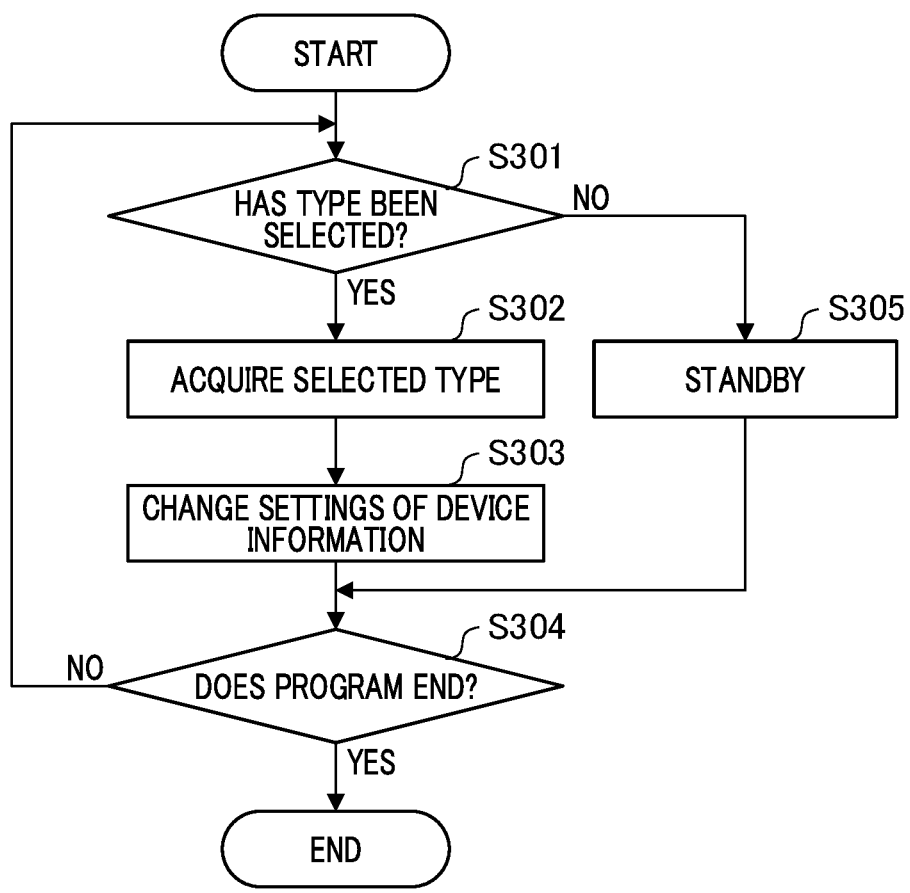
FIG. 10 is a flowchart illustrating an example of a process for changing device information acquired from a device in the second embodiment.

FIG. 9 illustrates an example of a type selection screen 901 of the information separation device 101b according to the second embodiment. FIG. 10 is a flowchart illustrating an example of the process for changing the device information acquired from the device 102 in the second embodiment.

The type selection screen 901 of the information separation device 101b shown in FIG. 9 is displayed on the output device 115a of the information acquisition device 101a. The type selection screen 901 also includes a radio button 910 that alternatively receives a selection input of the type (Default, Agents A to C) of the information separation device to be set, a change button 911, and a cancel button 912. The change button 911 receives an input for determining the change of the type by the radio button 910. The cancel button 912 receives an input for canceling the change of the type performed by the radio button 910.

In step S301 shown in FIG. 10, the UI control unit 203a of the information acquisition device 101a determines whether or not the selection input of the type of the information separation device performed by the radio button 910 has been received by the operation of the change button 911 on the type selection screen 901. If it is determined that the selection input has been received, the process proceeds to step S302. In contrast, if it is determined that the selection input has not been received, the process proceeds to step S305, and the device information processing unit 201a waits for the process for a predetermined time. Subsequently, the process proceeds to step S304.

In step S302, the UI control unit 203a acquires the type of the information separation device selected by the radio button 910 on the type selection screen 901.

In step S303, the device information processing unit 201a changes the setting of the device information acquired from the device 1002 by the information acquisition device 101a for transmitting to the information separation device to be set, based on the type of the selected information separation device. At this time, the device information processing unit 201a refers to the Data Table C of the storage unit 204a, extracts the item of the device information corresponding to the type of the selected information separation device, and sets the extracted item to serve as the device information acquired from the device 102.

For example, when "A" has been selected as the type of the information separation device, the device information processing unit 201a sets the item corresponding to "MUST" and "A" in the Data Table C to serve as the device information acquired from the device 102. Similarly, when "B" has been selected to serve as the type of the information separation device, the device information processing unit 201a sets the items corresponding to "MUST" and "B" in the Data Table C to serve as the device information acquired from the device 102.

In step S304, the device information processing unit 201a determines whether or not the program ends. If it is determined that the program ends, the process of FIG. 10 ends. In contrast, if it does not determine that the program ends, the process returns to step S301. Thus, the description of FIG. 10 ends.

Figure 12:
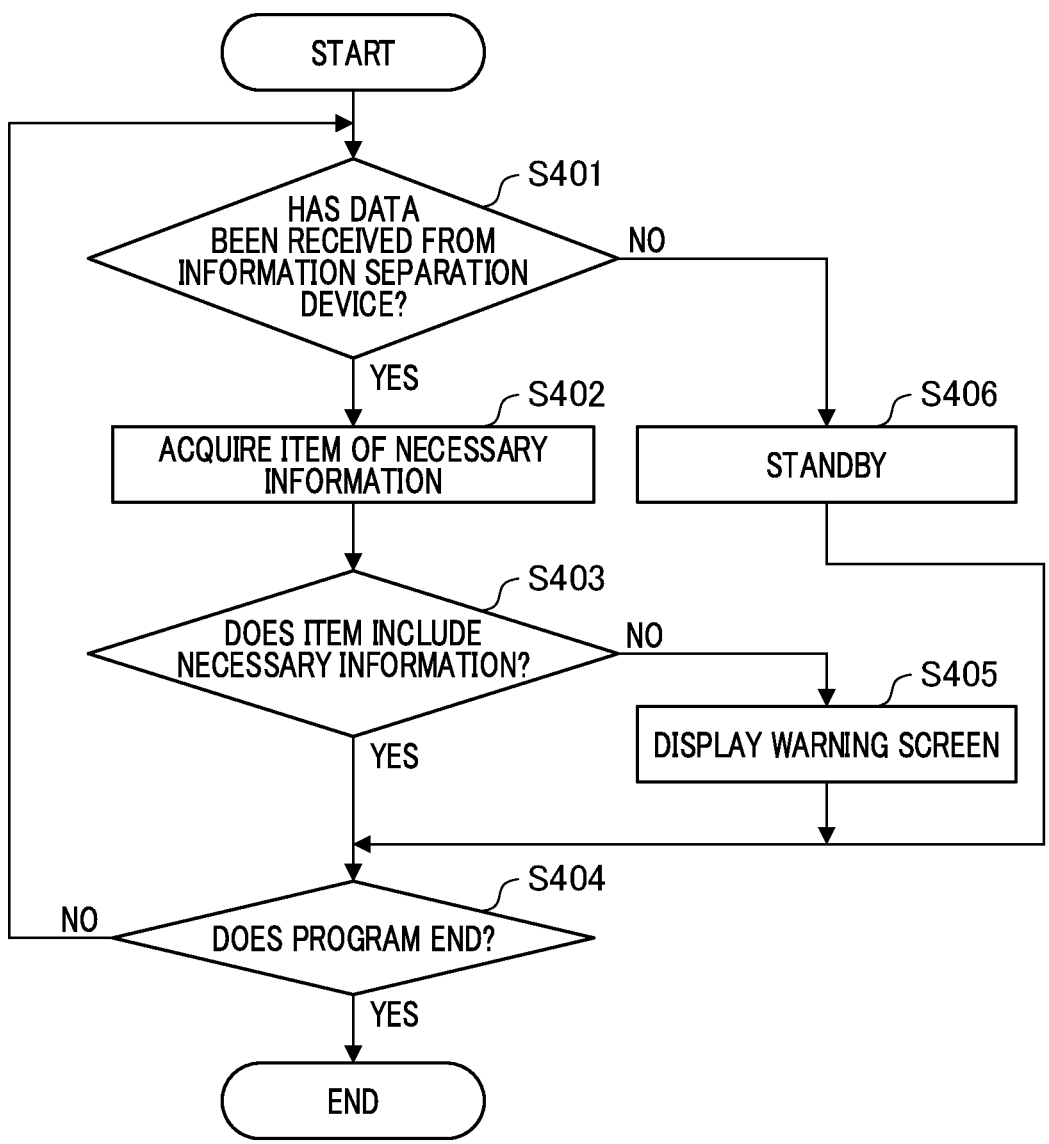
FIG. 12 is a flowchart illustrating an example of a process performed by the information acquisition device when data is received from the information separation device in the second embodiment.

FIG. 12 is a flowchart illustrating an example of the process by the information acquisition device 101a when data is received from the information separation device 101b in the second embodiment.

In step S401, the transmission/reception unit 202a of the information acquisition device 101a determines whether or not the data has been received from the information separation device 101b. When the data has been received from the information separation device 101b, the process proceeds to step S402. In contrast, if no data has been received from the information separation device 101b, the process proceeds to step S406, and the device information processing unit 201a waits for the process for a predetermined time. Subsequently, the process proceeds to step S404.

In step S402, the device information processing unit 201a refers to the Data Table C of the storage unit 204a and acquires the item of the necessary information to which "MUST" is shown of the items of the device information.

In step S403, the device information processing unit 201a determines whether or not the data received from the information separation device 101b includes all the necessary information. For example, if any item of the necessary information is missing in the received data, the device information processing unit 201a determines that the received data does not include all the necessary information. Alternatively, if the data size for the necessary information portion of the received data is less than a specified value, the device information processing unit 201a determines that the received data does not include all the necessary information.

If it is determined that the received data includes all the necessary information, the process proceeds to step S404. In contrast, if it is not determined that the received data includes all the necessary information, the process proceeds to step S405. In step S405, the UI control unit 203a causes the output device 115a to display a warning screen 1101 shown in FIG. 11. Subsequently, the process proceeds to step S404.

Figure 11:
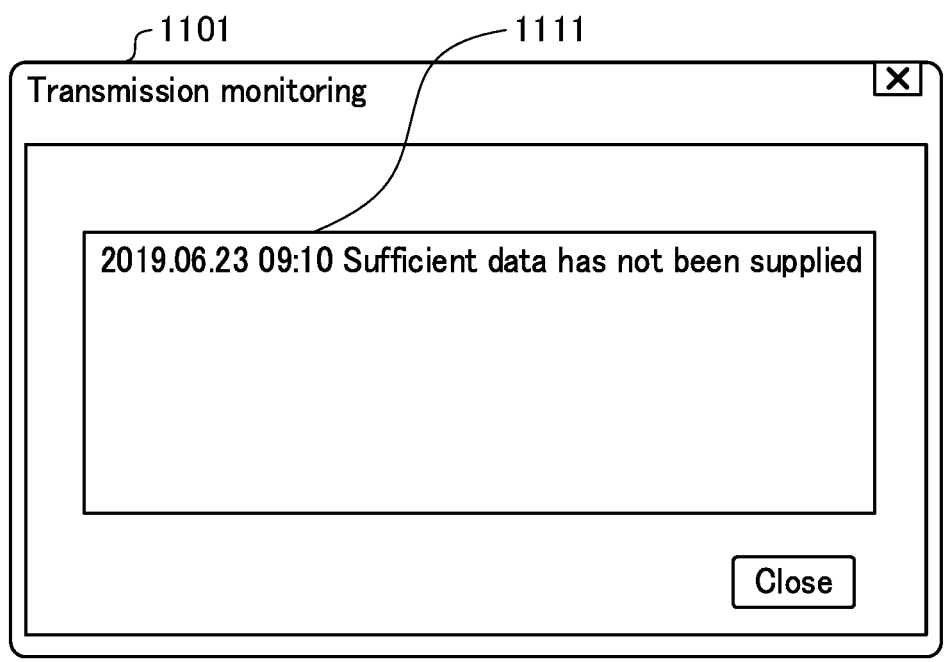
FIG. 11 illustrates an example of a warning screen in the second embodiment.

The warning screen 1101 shown in FIG. 11 includes, for example, a log display 1111 indicating that some of the necessary information is not included in the received data, and that sufficient data has not been supplied.

In step S404, the device information processing unit 201a determines whether or not the program ends. If it determines that the program ends, the process of FIG. 12 ends. In contrast, if it does not determine that the program ends, the process returns to step S401. Thus, the description of FIG. 12 ends.

In the second embodiment, in addition to the effect similar to the first embodiment, it is sufficient to acquire the minimum necessary device information from the device 102 by controlling the information acquired from the device 102 in accordance with the type of the information separation device 101b. According to the second embodiment, it is possible to reduce the possibility in which the unnecessary information is transmitted to another cloud service corresponding to the information separation device 101b.

Additionally, in the second embodiment, when the data received from the information separation device 101b does not include all the necessary information, the warning screen 1101 is displayed on the output device 115a (S405). The display of the warning screen 1101 allows the information acquisition device 101a to confirm whether or not the necessary information has been eliminated from the device information in the information separation device 101b.

Third Embodiment

The third embodiment is a configuration example in which it is possible to confirm whether or not the data received in the cloud service 105 is after monitoring, thereby improving the reliability of the system.

In the cloud service 105, a mechanism of confirming that data has been transmitted after monitoring by the firewall 104 can ensure that the cloud service 105 has not received problematic information, so that the reliability of the system can be improved. In order to realize such a mechanism, in the third embodiment, the process by the monitoring unit 221 of the firewall 104 is different from the first embodiment and the second embodiment as described below.

Figure 13:
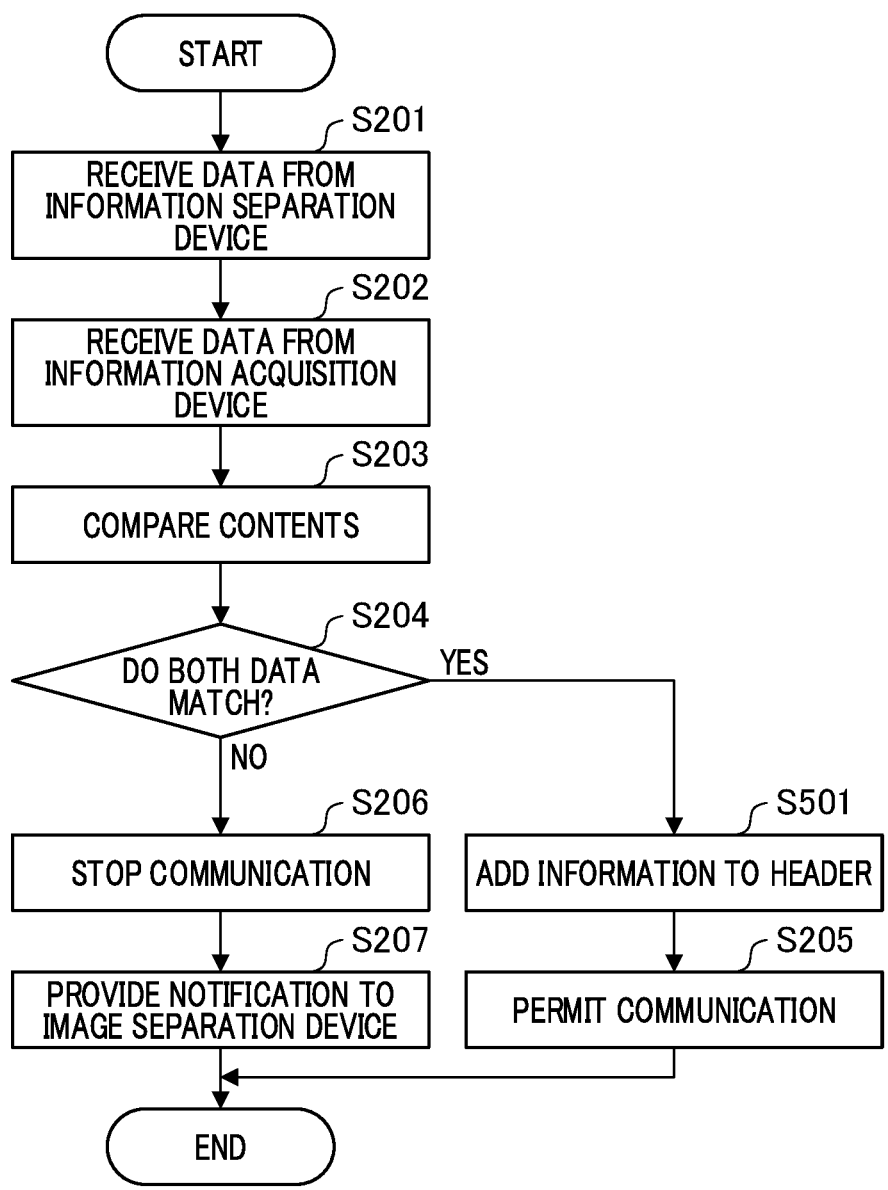
FIG. 13 is a flowchart of an example of the firewall monitoring processing in the third embodiment.

FIG. 13 is a flowchart of an example of monitoring processing by the firewall 104 in the third embodiment. The process of FIG. 13 is a modification of FIG. 7 described in the first embodiment, and differs in that the process of step S501 is performed when both data are identical in step S204 ("YES" in S204).

In step S501, the monitoring unit 221 adds the information indicating that the monitoring unit 221 has monitored the header of the packet related to the device information transmitted from the information acquisition device 101a. For example, the monitoring unit 221 adds the information "1.1 FIRST AGENT" to Via of the HTTP header portion of the packet. After step S501, the process proceeds to step S205. Thus, the description of FIG. 13 ends.

The cloud service 105 of the third embodiment can determine whether or not the packet has been monitored by the firewall 104 by referring to the header portion of the received packet. When there is no information indicating that the monitoring unit 221 has monitored in the header, the cloud service 105 discards the service information without receiving it. Therefore, it is possible to reduce the concern that information not intended by the user is stored in the cloud service 105.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-172062, filed Sep. 20, 2019 which is hereby incorporated by reference wherein in its entirety.

What is claimed is:

1. A system including a first agent and a device management system,
the first agent comprising:
a memory storing instructions; and
a processor executing first instructions causing the first agent to:
acquire device information from a network device;
transmit the acquired device information to a second agent;
receive service information that has excluded some information of the device information from the second agent; and
transmit the service information to the device management system,
the device management system comprising:
a memory storing instructions; and
a processor executing second instructions causing the device management system to:
receive service information after monitoring has been performed by a comparison between service information transmitted from the first agent to the device management system and service information transmitted from the second agent to the first agent.

2. The system according to claim 1,
wherein the service information after monitoring has been performed is information permitted to be transmitted to the device management system if the service information transmitted from the first agent to the device management system matches the service information transmitted from the second agent to the first agent.

3. The system according to claim 1,
wherein the information excluded from the device information by the second agent is information regarding a user of the network device.

4. The system according to claim 1,
wherein, during acquisition of the device information, the first agent changes an item of the device information acquired from the network device in accordance with the setting of the type of the second agent.

5. The system according to claim 1,
wherein the first instructions further cause the first agent to output a warning based on a data size or contents of the service information received from the second agent.

6. The system according to claim 5,
wherein, during the warning, in the received service information, the warning is output upon exclusion of predetermined information of the device information by the second agent.

7. The system according to claim 1,
wherein, if the service information transmitted from the first agent to the device management system does not have information indicating that the monitoring has been performed, the device management system discards the service information without receiving it.

8. A method in a system including a first agent and a device management system, the method comprising:

acquiring device information from a network device by the first agent;

transmitting the acquired device information to a second agent by the first agent;

receiving service information that has excluded some information of the device information from the second agent, by the first agent;

transmitting the service information to the device management system by the first agent; and receiving service information after monitoring has been performed by a comparison between service information transmitted to the device management system from the first agent and service information transmitted to the first agent from the second agent, by the device management system.

* * * * *